(12) United States Patent
Fischer et al.

(10) Patent No.: US 7,323,510 B2
(45) Date of Patent: Jan. 29, 2008

(54) METHOD FOR THE PRODUCTION OF WATER-IN-WATER POLYMER DISPERSIONS

(75) Inventors: Ulrich Fischer, Neuss (DE); Otto Schroers, Krefeld (DE); Wolfgang Woebel, Willich (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 39 days.

(21) Appl. No.: 10/432,624

(22) PCT Filed: Dec. 1, 2001

(86) PCT No.: PCT/EP01/14062

§ 371 (c)(1),
(2), (4) Date: Jun. 6, 2003

(87) PCT Pub. No.: WO02/46275

PCT Pub. Date: Jun. 13, 2002

(65) Prior Publication Data

US 2004/0034145 A1    Feb. 19, 2004

(30) Foreign Application Priority Data

Dec. 8, 2000   (DE)   ................. 100 61 483

(51) Int. Cl.
*C08K 3/20*   (2006.01)
(52) U.S. Cl. ............. 524/457; 524/458; 524/459; 524/460; 524/461
(58) Field of Classification Search ............. 524/457, 524/458, 459, 460, 461
See application file for complete search history.

(56) References Cited

U.S. PATENT DOCUMENTS

| | | | |
|---|---|---|---|
| 3,979,349 A * | 9/1976 | Fink et al. ................. | 524/130 |
| 5,597,859 A | 1/1997 | Hurlock et al. | |
| 5,962,570 A * | 10/1999 | Sato et al. ................. | 524/457 |

FOREIGN PATENT DOCUMENTS

| | | |
|---|---|---|
| AU | B-57474/94 | 1/1995 |
| DE | 196 52 040 | 6/1997 |
| DE | 198 51 024 A1 | 5/2000 |
| EP | 0 183 466 | 6/1986 |
| EP | 0 524 513 A2 | 1/1993 |
| EP | 0 630 909 | 12/1994 |
| EP | 0 630 909 A1 | 12/1994 |
| EP | 0 644 302 | 7/1995 |
| EP | 0 814 099 | 12/1997 |
| EP | 0 831 177 A2 | 3/1998 |
| WO | 98/14405 | 4/1998 |
| WO | 98 31748 | 7/1998 |
| WO | 98/31749 | 7/1998 |
| WO | WO 98/54234 | 12/1998 |
| WO | WO 00/61501 | 10/2000 |

OTHER PUBLICATIONS

Josef M Reuter: "Anwendung organischer polymerer flockungsmittel bei der abwasser-reinigung in der metallindustrie" Sonderdruck Aus Umwelt, pp. 27-36 1981.
Heinz Becker et al.: "Faserstoff-pruefungen im nasslabor" Papiermacherschule Gernsbach, vol. 15, pp. 68-71 Dec. 1995.
BW1 "Nachstellung von Beispiel 1 aus EP 1 353 975 B1"—Information provided in connection with Opposition filed on Oct. 10, 2006, against aforementioned European patent.
BW2 "Abwandlung von Beispiel 1 aus EP 1 353 975 B1, ohne Salzzugabe"—Information provided in connection with Opposition filed on Oct. 10, 2006, against aforementioned European patent.

* cited by examiner

*Primary Examiner*—Kriellion A Sanders
(74) *Attorney, Agent, or Firm*—Oblon, Spivak, McClelland, Maier & Neustadt, P.C.

(57) ABSTRACT

The invention relates to methods for manufacturing a water-in-water polymer dispersion containing polymer A and at least one polymer dispersant B, according to which monomers, which are dispersed in an aqueous phase containing water-soluble dispersant B, are subjected to radical polymerization, possibly following the addition of a water-soluble salt, and, after polymerisation, a water-soluble acid is added to the water-soluble and/or water-swellable polymer A obtained in this way, where the acid is added in quantities of 0.1 to 5% by weight and the salt in quantities of up to a maximum of 3% by weight, each referred to the total dispersion, and the total quantity of salt and acid amounts to a maximum of 5% by weight, referred to the total dispersion.

50 Claims, 1 Drawing Sheet

METHOD FOR THE PRODUCTION OF WATER-IN-WATER POLYMER DISPERSIONS

Figure 1:
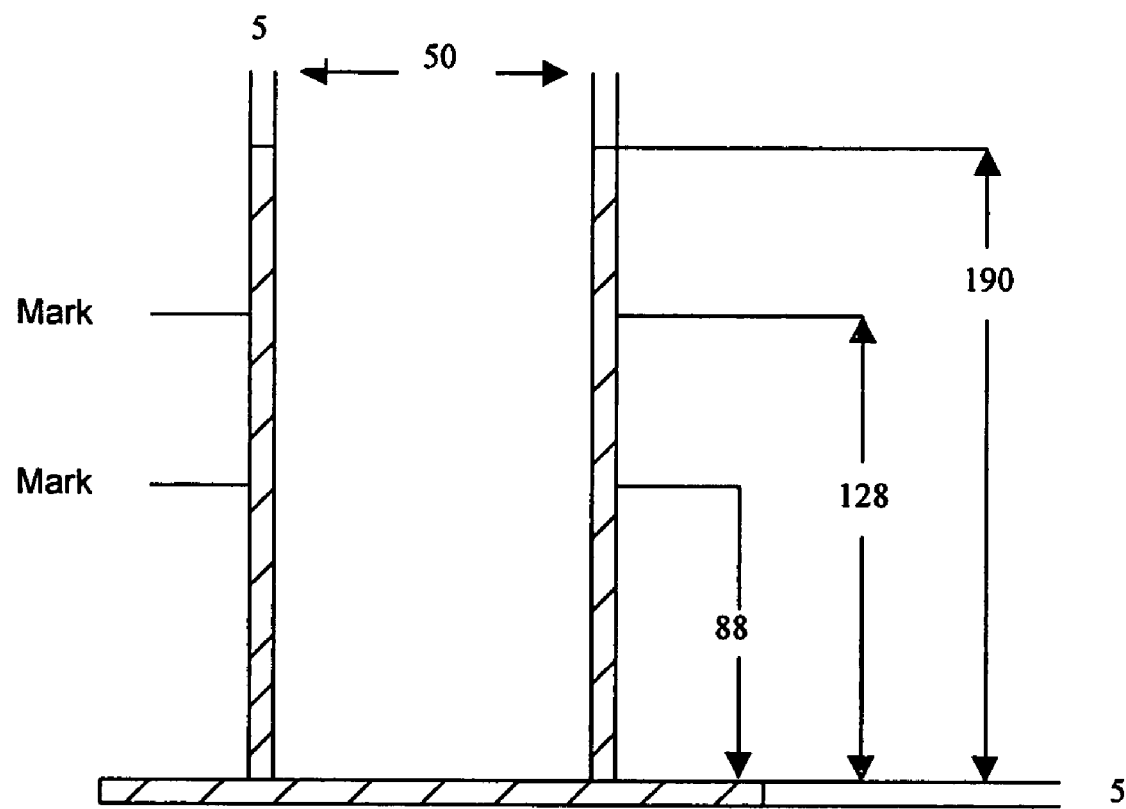

The present invention relates to methods for manufacturing water-in-water polymer dispersions containing a finely dispersed, water-soluble or water-swellable polymer A and a continuous, aqueous phase containing a polymeric dispersant B, the water-in-water polymer dispersions obtainable in this way and their use as auxiliaries in papermaking or as flocculants in the sedimentation of solids.

The manufacture of water-in-water polymer dispersions is described repeatedly in the prior art. The main target in this context is to obtain water-in-water dispersions that are easier to handle. Thus, it is known from international application WO 98/14405 that the addition of a mixture of a cosmotropic and a chaotropic or an anionic, organic salt during the manufacture of the dispersed polymer component is capable of lowering the viscosity of the water-in-water dispersions.

International application WO 98/31748 describes water-in-water dispersions which are stable and, despite a relatively high content of dispersed polymers, pourable, provided that, during production of the water-in-water dispersions, a water-soluble, inorganic salt is added to the dispersed monomer solution in quantities of at least 10% by weight prior to polymerisation. High salt quantities of this kind are not acceptable for some applications of water-in-water dispersions.

International application WO 98/31749 describes water-in-water dispersions which remain pourable and display no irreversible agglomeration in storage, provided that the water-in-water dispersions are already pourable after their production on account of their low viscosity. According to the teaching of this international application, this is achieved in that a polyhydroxy compound is added to the dispersion medium in which the monomer solution to be polymerised is present. However, when being further diluted, the water-in-water dispersions obtained, which may possibly also contain salts, must be diluted beyond a certain degree, because an undesirably great increase in the Brookfield viscosity otherwise occurs during dilution compared to the undiluted water-in-water dispersion. This is, however, disadvantageous for the application of the water-in-water dispersions.

European application EP-A-0 630 909 describes a method for manufacturing water-in-water dispersions, according to which a polyvalent, anionic salt is added to the dispersed monomer solution to be polymerised in quantities of at least 15% by weight for viscosity control. More salt is added to reduce the viscosity of the water-in-water dispersions obtained. Again, the large quantity of salt added means that the water-in-water dispersions cannot be used without difficulty for every application.

Moreover, in the case of the water-in-water dispersions known from the prior art, prolonged storage, especially under extreme conditions, such as temperatures of over 25° C. to 50° C., can result in changes, i.e. impairments of the advantageous properties of water-in-water dispersions, which lead to longer drainage times, for example.

Consequently, the object of the present invention was to provide a method by which water-in-water polymer dispersions are obtained that display virtually unchanged service properties even after storage under extreme conditions, such as temperatures of over 25° C. to 50° C.

According to the invention, this achieved by providing a method for manufacturing a water-in-water polymer dispersion containing a water-soluble and/or water-swellable polymer A and a polymeric, water-soluble dispersant B, according to which the monomers, which are dispersed in an aqueous phase containing water-soluble dispersant B, are subjected to radical polymerization, possibly following the addition of a water-soluble salt, and, after polymerization, a water-soluble acid is added to the water-in-water dispersion obtained in this way, which is characterized in that the acid is added in quantities of 0.1 to 5% by weight, the salt in quantities of up to a maximum of 3% by weight, each referred to the dispersion, and the acid and the salt together are added in quantities of a maximum of 5% by weight, referred to the total dispersion.

The acid is preferably added in quantities of 0.2 to 3.5% by weight, particularly preferably in quantities of 0.3 to 2% by weight, referred to the total dispersion.

Insofar as a salt is used in manufacturing the water-in-water polymer dispersion, this salt is preferably added in quantities of up to a maximum of 2.0% by weight, particularly preferably in quantities of 0.5 to 1.5% by weight, referred to the total dispersion. In this context, the quantities of added water-soluble acid and possibly added water-soluble salt should preferably amount to a maximum of 3.5% by weight, referred to the total dispersion.

Water-soluble organic acids and/or inorganic acids can be used as the acid added to the water-in-water polymer dispersions manufactured according to the invention. Particularly suitable for use as organic, water-soluble acids are carboxylic acids, sulphonic acids, phosphonic acids, preferably aliphatic or aromatic monocarboxylic, dicarboxylic, polycarboxylic acids and/or hydroxycarboxylic acids, preferably acetic acid, propionic acid, citric acid, oxalic acid, succinic acid, malonic acid, adipic acid, fumaric acid, maleic acid, benzoic acid, most particularly preferably citric acid, adipic acid and/or benzoic acid. Suitable for use as inorganic acids are water-soluble mineral acids, preferably hydrochloric acid, sulphuric acid, nitric acid and/or phosphoric acid. Citric acid, adipic acid, benzoic acid, hydrochloric acid, sulphuric acid and/or phosphoric acid is used with particular preference.

In order to implement the methods according to the invention, the monomers, preferably in the form of an aqueous monomer solution, are finely dispersed in an aqueous phase containing at least one polymeric dispersant B. These polymeric dispersants have a relatively low molecular weight and preferably display an average molecular weight $M_w$ of max. $2.0 \times 10^6$, preferably 50,000 to $1.2 \times 10^6$ g/mol, as measured by the GPC method (gel permeation chromatography with 1.5% formic acid as eluent against pullulan standards).

These polymeric dispersants display at least one functional group selected from the range of ether, carboxyl, sulpho, sulphate ester, amino, amido, imido, tert. amino and/or quaternary ammonium groups.

Cellulose derivatives, polyvinyl acetates, starch, starch derivatives, dextrans, polyvinylpyrrolidones, polyvinylpyridines, polyethylene imines, polyamines, polyvinylimidazoles, polyvinylsuccinimides, polyvinyl-2-methylsuccinimides, polyvinyl-1,3-oxazolidone-2, polyvinyl-2-methylimidazolines and/or their respective copolymers with maleic acid, maleic anhydride, fumaric acid, itaconic acid, itaconic anhydride, (meth)acrylic acid, salts of (meth)acrylic acid and/or (meth)acrylic amide compounds can be mentioned as examples of these.

Particularly preferably used as polymeric dispersants B are cationic polymers that are made up of at least 30% by weight, preferably at least 50% by weight, particularly preferably 100% by weight, cationic monomer units derived from cationic, ethyleneically unsaturated monomers, such as diallyldimethylammonium chloride, dialkylaminoalkyl (meth)acrylate or acrylamide with 1 to 3 C atoms in the alkyl or alkylene groups and protonated or quaternised into ammonium salts, preferably methyl chloride-quaternised ammonium salts of dimethylaminoethyl(meth)acrylate, dimethylaminopropyl(meth)acrylate, dimethylaminopropyl (meth)acrylamide, dimethylaminohydroxypropyl(meth) acrylate. Polydiallyldimethylammonium chloride is used with particular preference as the polymeric dispersant B in the method according to the invention.

In a preferred embodiment of the methods according to the invention, the water-soluble, polymeric dispersant B is used together with a water-soluble, polyfunctional alcohol and/or the product of its reaction with fatty amines. Particularly suitable in this context are polyalkylene glycols, preferably polyethylene glycols, polypropylene glycols, block copolymers of propylene/ethylene oxide, with molecular weights of 50 to 50,000, preferably 1,500 to 30,000, low-molecular polyfunctional alcohols, such as glycerin, ethylene glycol, propylene glycol, pentaerythritol and/or sorbitol as polyfunctional water-soluble alcohols, and/or the products of their reaction with fatty amines with $C_6$-$C_{22}$ in the alkyl or alkylene residue.

The aqueous phase in which the monomers are dispersed, preferably in the form of an aqueous solution, must contain sufficient water-soluble polymeric dispersant B and, if applicable, polyfunctional alcohol and/or the reaction product mentioned for the polymer A formed during polymerisation to remain dispersed and to prevent uncontrolled growth of the polymer particles and/or agglomeration of the polymer particles formed. Polymeric dispersant B and the other dispersant components possibly present are preferably added in quantities of 5 to 50% by weight, preferably 10 to 20% by weight, referred to the total dispersion.

If additional water-soluble dispersant components are used along with polymeric dispersant B, a weight ratio of polymeric dispersant B to these components of 1:0.01 to 0.5, preferably 1:0.01 to 0.3, should be maintained.

The monomers present in the aqueous phase containing polymeric dispersant B in dispersed form, preferably in finely and homogeneously dispersed form, comprise cationic and/or amphiphilic, ethyleneically unsaturated monomers, where their possibly present content of water-insoluble monomers is selected such as not to impair the water-solubility or water-swellability of polymer A obtained after polymerisation.

Polymers A manufactured by the method according to the invention are high-molecular, but nonetheless water-soluble or water-swellable polymers with an average molecular weight of $M_w$, as measured by the GPC method, of $>1.0\times10^6$ g/mol, where the average molecular weight $M_w$ of polymer A is always greater than that of polymeric dispersant B.

Compounds of the following general formula (I) can be used as non-ionic monomers for manufacturing polymers A:

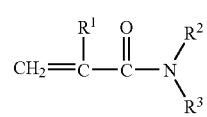

(I)

where
$R^1$ stands for hydrogen or a methyl residue, and
$R^2$ and $R^3$ stand, independently of each other, for hydrogen, for an alkyl or hydroxyalkyl residue with 1 to 5 C atoms.

(Meth)acrylamide, N-methyl(meth)acrylamide, N-isopropyl(meth)acrylamide or N,N-substituted (meth)acrylamides, such as N,N-dimethyl(meth)acrylamide, N,N-diethyl(meth) acrylamide, N-methyl-N-ethyl(meth)acrylamide or N-hydroxyethyl(meth)acrylamide, is preferably used, most particularly preferably acrylamide.

Compounds of the following general formula (II) are suitable as cationic monomers for manufacturing polymers A:

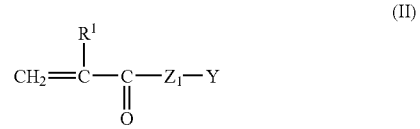

(II)

where
$R^1$ stands for hydrogen or a methyl residue,
$Z_1$ stands for O, NH or $NR_4$ with $R_4$ for an alkyl residue with 1 to 4 C atoms, and
Y for one of the groups

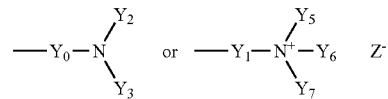

and
where
$Y_0$ and $Y_1$ stand for an alkylene residue, possibly substituted with OH groups, with 2 to 6 C atoms,
$Y_2$, $Y_3$, $Y_4$, $Y_5$, $Y_6$, $Y_7$, independently of each other, stand for an alkyl residue with 1 to 6 C atoms, and
$Z^-$ stands for halogen, acetate, $SO_4CH_3^-$.

Protonated or quaternised dialkylaminoalkyl(meth)acrylates or dialkylaminoalkyl(meth)acrylamides with $C_1$ to $C_3$ in the alkyl or alkylene groups are preferably suitable, particularly preferably the methyl chloride-quaternised ammonium salt of dimethylaminoethyl(meth)acrylate, dimethylaminopropyl(meth)acrylate, dimethylaminoethyl (meth)acrylate, diethylaminoethyl(meth)acrylate, dimethylaminomethyl(meth)acrylate, dimethylaminoethyl(meth) acrylamide and/or dimethylaminopropyl(meth)acrylamide.

Compounds of the following general formula (III) or (IV) are suitable as amphiphilic monomers:

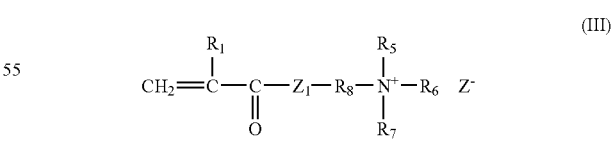

(III)

where
$Z_1$ stands for O, NH or $NR_4$ with $R_4$ for alkyl with 1 to 4 carbon atoms,
$R_1$ stands for hydrogen or a methyl residue,
$R_8$ stands for alkylene with 1 to 6 carbon atoms,
$R_5$ and $R_6$ stand, independently of each other, for an alkyl residue with 1 to 6 carbon atoms, $R_7$ stands for an alkyl, aryl and/or aralkyl residue with 8 to 32 carbon atoms, and $Z^-$ stands for halogen, pseudo-halogen, $SO_4CH_3^-$ or acetate or

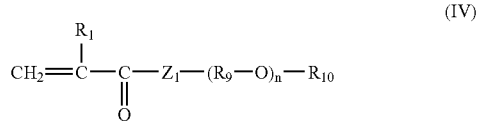

(IV)

where $Z_1$ stands for O, NH or $NR_4$ with $R_4$ for alkyl with 1 to 4 carbon atoms, $R_1$ stands for hydrogen or a methyl residue, $R_{10}$ stands for hydrogen, an alkyl, aryl and/or aralkyl residue with 8 to 32 carbon atoms, $R_9$ stands for an alkylene residue with 2 to 6 carbon atoms, and n stands for an integer between 1 and 50.

These are preferably conversion products of (meth)acrylic acid with polyethylene glycols (10 to 40 ethylene oxide units) that have been etherified with fatty alcohol, or the corresponding conversion products with (meth)acrylamide.

For manufacturing polymer A, a monomer composition is preferably selected which consists of 1 to 99% by weight, preferably 20 to 80% by weight, cationic monomers, referred in each case to the total quantity of monomer. Particularly preferably, polymer A is manufactured using a mixture of non-ionic monomers, preferably acrylamide, and cationic monomers of general formula II, preferably quaternised dialkylaminoalkyl(meth)acrylates and/or dialkylaminoalkyl(meth)acrylamides. Most particularly preferably, dimethylaminoethyl(meth)acrylate quaternised with methyl chloride is used. In monomer mixtures of this kind, the content of cationic monomers is preferably at least 20%.

Referred to the total solution or to the resultant total dispersion, the monomers are dispersed in quantities of 5 to 60% by weight, preferably 10 to 50% by weight, in the aqueous phase, which contains at least one dispersant B. High-molecular polymer A is formed from the monomers by polymerisation.

Polymeric dispersant B and polymer A are different, where this difference can be a result of physical parameters, such as different molecular weights and/or chemical structures, or of different monomer compositions.

In the method according to the invention, polymerisation is preferably performed in the presence of a water-soluble salt. Ammonium, alkaline metal and/or alkaline-earth metal salts can be used as the water-soluble salt, preferably ammonium, sodium, potassium, calcium and/or magnesium salts. Salts of this kind can be salts of an inorganic acid or an organic acid, preferably of an organic carboxylic acid, sulphonic acid or phosphoric acid, or of a mineral acid. The water-soluble salts are preferably salts of an aliphatic or aromatic monocarboxylic, dicarboxylic or polycarboxylic acid, a hydoxycarboxylic acid, preferably acetic acid, propionic acid, citric acid, oxalic acid, succinic acid, malonic acid, adipic acid, fumaric acid, maleic acid or benzoic acid or sulphuric acid, hydrochloric acid or phosphoric acid. Most particularly preferably, sodium chloride, ammonium sulphate and/or sodium sulphate are used as water-soluble salts.

The salt can be added to the system before polymerisation, during polymerisation or after polymerisation. Addition of the salt before polymerisation of the monomers is preferred.

Following polymerisation, a water-soluble acid is added to the water-in-water polymer dispersion in quantities of 0.1 to 5% by weight, preferably in quantities of 0.2 to 3.5% by weight, particularly preferably in quantities of 0.3 to 2.0% by weight, referred in each case to the total dispersion. Addition is preferably performed while stirring. Suitable water-soluble acids are organic acids and/or inorganic acids, preferably organic carboxylic acids, sulphonic acids, phosphonic acids or mineral acids.

Preferably suitable as organic acids are carboxylic acids, such as aliphatic or aromatic monocarboxylic, dicarboxylic, polycarboxylic acids and/or hydroxycarboxylic acids, preferably acetic acid, propionic acid, citric acid, oxalic acid, succinic acid, malonic acid, adipic acid, fumaric acid, maleic acid, benzoic acid, particularly preferably citric acid, adipic acid and/or benzoic acid, while hydrochloric acid, sulphuric acid and/or phosphoric acid are preferably suitable as inorganic acids. Citric acid, adipic acid and/or benzoic acid are particularly preferred.

In order to implement the method according to the invention, the continuous aqueous phase is produced by dissolving or diluting polymeric dispersant B, possibly a polyfunctional alcohol and/or a corresponding product of conversion with fatty amines, in water and dispersing the monomers or their aqueous solution by known dispersion methods, preferably by stirring.

The monomers of polymer A can be incorporated into the continuous aqueous phase either directly as such or preferably in the form of an aqueous monomer solution.

The monomer solution generally contains 5 to 60% by weight, preferably 10 to 50% by weight, monomers, referred to the total solution, while the remainder consists of water and any auxiliaries contained therein, such as chelating agents. Polymerisation is started, for example, by means of radical initiators referred to as polymerisation initiators. The radical initiators used are preferably azo compounds, such as 2,2-azobiisobutyronitrile, 2,2-azobis(2-amidino-propane)dihydrochloride or, preferably, potassium persulphate, ammonium persulphate, hydrogen peroxide, possibly in combination with a reducing agent, such as an amine or sodium sulphite. Referred to the monomers to be polymerised, the quantity of initiator is generally in the region of $10^{-3}$ to 1% by weight, preferably $10^{-2}$ to 0.1% by weight. The initiators can either be added completely at the start of polymerisation, or also only partly with subsequent addition of the remainder throughout the course of polymerisation. Similarly, the monomers or the monomer solution can be completely or partly dispersed in dispersant B at the start of polymerisation, in which case the remainder of the monomers or the monomer solution is added in metered partial quantities or as a continuous stream distributed over the entire course of polymerisation. Moreover, it is also possible to manufacture the water-in-water dispersions in accordance with the method in EP-A-0 664 302, the corresponding disclosure of which is herewith introduced as a reference. Essentially, this procedure involves the removal of water being during polymerisation and, if necessary, the addition of polymeric dispersant B.

The polymerisation temperature is generally 0 to 120° C., preferably 50 to 90° C. Polymerisation is preferably performed in such a way that the system is flushed with inert gas and polymerisation takes place in an inert-gas atmosphere, e.g. in a nitrogen atmosphere. The polymerisation conversion or the end of polymerisation can easily be ascertained by determining the residual monomer content. The methods for doing this are known to a person skilled in the art.

Following polymerisation, it may be advantageous to cool the reaction mixture before the acid is added, preferably while stirring the dispersion.

The method according to the invention succeeds in producing water-in-water dispersions within generally short manufacturing times.

The water-in-water polymer dispersions obtainable according to the invention have the unexpected advantage that, not only after production, i.e. before being stored for any length of time, and possibly after dilution with water, they are excellent flocculants in the sedimentation of solids, preferably in the conditioning of water and process water or the treatment of waste water or in the extraction of raw materials, preferably of coal, aluminium or petroleum, auxiliaries in papermaking or demulsifiers in the separation of water mixtures containing oil and/or grease, excellent thickeners, retention agents and drainage aids in papermaking and/or additives for crop protection products, possibly together with other biologically effective substances, or anti-erosion agents. The water-in-water dispersions obtainable according to the invention display virtually no change in this excellent efficacy even after lengthy storage under extreme conditions, e.g. at elevated temperatures, i.e. temperatures of more than 25° C. and up to a maximum of 50° C. This preservation of quality of the dispersions obtainable according to the invention is a hitherto unfulfilled demand of users in industry and indispensable if, among other things, these dispersions are to be transported to, and used in, regions subject to extreme climatic conditions.

Methods

1. Determination of the Solution Viscosity

To determine the solution viscosity of the water-in-water dispersions manufactured according to the invention, a 5% by weight solution in fully demineralised water is prepared, referred to the water-in-water polymer dispersion. 340 g of the 5% solution are required for the measurement. To this end, the necessary quantity of fully demineralised water is placed in a 400 ml beaker. The water in the beaker is then stirred with a finger agitator so vigorously that a vortex forms that reaches down to the bottom of the beaker. The amount of water-in-water dispersion required to prepare the 5% solution is added to the agitated water in the beaker as a single dose using a disposable syringe. The solution is then stirred for 1 hour at 300 rpm (±10 rpm). After standing for 10 minutes, the Brookfield viscosity is determined with the help of an RVT-DV II Brookfield viscometer using a No. 2 spindle at speed 10.

2. Determination of the Salt Viscosity 289 g fully demineralised water are weighed into a 400 ml beaker. The water in the beaker is then stirred with a finger agitator so vigorously that a vortex forms that reaches down to the bottom of the beaker. 17 g of the water-in-water dispersion prepared according to the invention are added to the agitated water in the beaker as a single dose using a disposable syringe. Once the water-in-water dispersion has dissolved, 34 g sodium chloride (technical) are strewn in. The solution is stirred for 60 minutes at 300±10 rpm and then left to stand for another 10 minutes. The Brookfield viscosity is subsequently determined with the help of an RVT-DV II Brookfield viscometer using a No. 1 spindle at speed 10.

3. Determination of the Flocculation Value Using Stammberge Slurry

This method is used to determine the sedimentation time required by the flocculated solid during solid/liquid separation by sedimentation to sediment through a defined stretch of the liquid column. For implementation of the method, refer to the publication by J. Reuter in "Umwelt" January 1981, pages 25 to 27.

A dispersion of the following substances is first prepared for the measurement:

The solid used is "Blauton HFF-Spezial", approx. 37% $Al_2O_3$>95% under 2 μm (Tonwerke Braun Witterschlick/Bonn), which is dispersed in Krefeld tap water (or synthetic tap water of 25° German hardness).

To this end, 18 g Blauton are added to 1000 ml tap water. The mixture is then dispersed with a mixer (10,000±100 rpm) for 20 seconds. The resultant dispersion is poured into a standardised test cylinder (see FIG. 1) up to the top mark. The test cylinder has two marks 40 mm apart, is made of plexiglass and holds 250 ml up to the top mark. The numbers in FIG. 1 are in millimeters.

Preparation of the water-in-water dispersion for determination of the flocculation value:

The water-in-water dispersions to be tested are diluted with tap water to a polymer content of 0.01% by weight in accordance with their polymer content (polymer A and polymeric dispersant B).

In order to measure the flocculation value, the test cylinder filled with the clay dispersion described above is placed under a finger agitator. While stirring (320 rpm), 2.5 ml aluminium sulphate solution (200 g $Al_2(SO_4)_3$×18 $H_2O$/liter distilled water) are added, after which 5 ml of the 0.01% polymer solution described above are added within 15 seconds and the agitator is switched off after a further 5 seconds. This now gives rise to flocculation (agglomeration) of the clay dispersion, which settles rapidly. Measurement of the time is started once the clay flocs have reached the upper (first) mark on the test cylinder. The time taken to reach the lower (second) mark is referred to as the flocculation value in seconds.

The smaller the flocculation value, the more advantageous the effect of the flocculant.

4. Determination of Drainage Acceleration Using a Schopper-Riegler Beating and Freeness Tester This test method is described by H. Becker and D. Zerler in the "Schriftenreihe der Papiermacherschule", Vol. 15, first edition 1995, pp. 68 to 71. According to this test method, the acceleration of drainage resulting from the addition of water-in-water dispersions to defined pulp suspensions is determined with the help of a Schopper-Riegler beating and freeness tester (Haage).

To this end, water-in-water dispersions are adjusted to a polymer content (polymer A and polymeric dispersant B) of 0.01% by weight, using fully demineralised water in each case. The drainage apparatus used is the above-mentioned Schopper-Riegler apparatus, which comprises a 2000 ml metal cup with a wire on the underside which is sealed off with a cone during filling.

The acceleration of drainage is determined on a 1% by weight pulp suspension made of standard recovered paper.

To this end, 3 g oven-dry recovered paper fibres are adjusted with tap water to 300 g of a 1% by weight pulp suspension in the Schopper-Riegler freeness cup. The drainage accelerating agent described above, consisting of a water-in-water dispersion, is adjusted to a 0.01% by weight solution. The drainage tests are performed with 3 polymer concentrations, where 3 ml, 6 ml and 9 ml of the 0.01% drainage agent are each diluted with 200 ml tap water and this solution is added to the paper fibre suspension in the Schopper-Riegler freeness cup and made up to 1000 ml with tap water in each case. The contents of the cup are then transferred to the filling chamber of the Schopper-Riegler apparatus, which is closed at the bottom, and the sealing cone is immediately unlocked. The time is measured that is required to filter off 700 ml of the 1000 ml paper fibre suspension after opening the sealing cone. To this end, the filtrate is collected and the time taken to reach 700 ml recorded. This time is referred to as the drainage time.

EXAMPLES

In the following examples, the solution viscosity or salt viscosity, the flocculation value and the drainage effect were determined in accordance with the methods described above. The term "solution" is always taken to mean an aqueous solution.

Example 1

231.0 g acrylamide solution (50%), 231.1 g fully demineralised water, 43.2 g dimethylaminoethylacrylate quaternised with methyl chloride (80%), 9.5 g technical ammonium sulphate, 0.2 g of the sodium salt of diethylenetriamine pentaacetic acid (40%), 400 g polydiallyldimethylammonium chloride (40%), 14.25 g polyethylene glycol with a molecular weight of 9,000 to 12,000 and 5 g 2,2-azobis(2-amidinopropane)dihydrochloride are put into a 2 l flask fitted with an agitator, a nitrogen supply line and a connection to a vacuum pump and dispersed homogeneously by stirring. The flask is deaerated for approx. 10 minutes by connecting it to a vacuum pump and the mixture is then blown out with nitrogen for approx. 15 minutes in order to remove the remaining oxygen. While stirring at 100 to 150 rpm, the mixture is heated to 35° C. in order to polymerise the monomers. Once a maximum temperature of 75° C. has been reached, the mixture is briefly re-stirred for 15 minutes. Subsequently, 10 g citric acid in fine powder form are strewn in and mixed with the dispersion by stirring. After 20 minutes of constant stirring, the water-in-water dispersion obtained is cooled to 20° C.

The solution viscosity of the water-in-water dispersion was determined as being 60 mPa·s, as described above. The salt viscosity was 36 mPa·s, again as described above.

Comparative Example 1

Example 1 was repeated, with the difference that citric acid was not added at any time.
The 5% solution viscosity of the water-in-water dispersion thus obtained was determined, as described above, as being 52 mPa·s and the salt viscosity as being 32 mPa·s.

Example 2

231.0 g acrylamide solution (50%), 231.1 g fully demineralised water, 43.2 g dimethylaminoethylacrylate quaternised with methyl chloride (80%), 9.5 g technical ammonium sulphate, 0.2 g of the sodium salt of diethylenetriamine pentaacetic acid (40%), 400 g polytrimethammoniumpropylacrylamide chloride (40%), 14.25 g polyethylene glycol with a molecular weight of 9,000 to 12,000 and 4 g 2,2-azobis(2-amidinopropane)dihydrochloride are put into a 2 l flask fitted with an agitator, a nitrogen supply line and a connection to a vacuum pump and dispersed by stirring. The flask is deaerated for approx. 10 minutes by connecting to a vacuum pump and the mixture is then blown out with nitrogen for approx. 15 minutes in order to remove the remaining oxygen. While stirring at 100 to 150 rpm, the mixture is heated to 35° C. in order to polymerise the monomers. Once a maximum temperature of 76° C. has been reached, the mixture is briefly re-stirred for 15 minutes. Subsequently, 10 g citric acid in fine powder form are strewn in and mixed with the dispersion by stirring. After 35 minutes of constant stirring, the water-in-water dispersion obtained is cooled to 20° C.

The solution viscosity of the water-in-water dispersion was determined as being 300 mPa·s, as described above. The salt viscosity was 150 mPa·s, again as described above.

Comparative Example 2

Example 2 was repeated, except that citric acid was not added at any time.
The 5% solution viscosity of the water-in-water dispersion thus obtained was determined, as described above, as being 280 mPa·s and the salt viscosity, as described above, as being 135 mPa·s.

Example 3

163.2 g fully demineralised water, 144.75 g 80% by weight trimethylammonium ethylacrylate chloride, 231.0 g 50% by weight acrylamide solution, 420.0 g 40% by weight polydiallyldimethylammonium chloride with a viscosity of the aqueous solution in the range of 200 to 400 mPas, 14.0 g polyethylene glycol with a molecular weight in the range of 9,000 to 12,000, 12.2 g technical ammonium sulphate, 0.26 g 40% by weight diethylenetriamine valeric acid sodium salt and 1.54 g 2,2-azobis(2-amidinopropane)dihydrochloride are put into a 2 l flask fitted with an agitator, a nitrogen supply line and a connection to a vacuum pump.

The pH value of the solution is 5.0. The solution is freed of oxygen and polymerised in accordance with the procedure specified in Example 1. After a maximum temperature of 82° C. has been reached, 12.85 g fine citric acid powder are mixed into the water-in-water dispersion by stirring, as described in Example 1, and the dispersion is then cooled to 20° C. while stirring constantly. The polymer content of the dispersion is 39.9% by weight.

The dispersion has a solution viscosity of 730 mPas and a salt viscosity of 210 mPas. A salt viscosity of 214 mPas is determined after storing the dispersion for a period of 60 days at a temperature of 40° C.

Comparative Example 3

Example 3 was repeated, but without adding citric acid at any time.
The dispersion thus obtained has a solution viscosity of 700 mPas and a salt viscosity of 190 mPas. A salt viscosity of 136 mPas is determined after storage of the dispersion for a period of 60 days at a temperature of 40° C., this corresponding to a decrease of 28.4% referred to the value after preparation of the dispersion.

Example 4

272.6 g fully demineralised water, 66.9 g 80% by weight trimethylammonium ethylacrylate chloride, 321.0 g 50% by weight acrylamide solution, 310.0 g 40% by weight polytrimethylammoniumpropylacrylamide chloride with a viscosity of the aqueous solution in the range of 150 to 300 mPas, 20.0 g technical ammonium sulphate, 2.0 g 5% by weight diethylenetriamine valeric acid sodium salt and 0.5 g 2,2-azobis(2-amidinopropane)dihydrochloride are put into a 2 l flask fitted with an agitator, a nitrogen supply line and a connection to a vacuum pump.

The solution is freed of oxygen, heated to 40° C. and polymerised in accordance with the procedure specified in Example 1. After a maximum temperature of 86° C. has been reached, 5.0 g fine citric acid powder are mixed into the water-in-water polymer dispersion by stirring and the dispersion is then cooled to 20° C. while stirring constantly. The polymer content of the dispersion is 33.8% by weight.

The dispersion has a solution viscosity of 564 mPas and a salt viscosity of 248 mPas. The solution viscosity is 308 mPas after storage of the dispersion for a period of 55 days at a temperature of 50° C., this corresponding to a decrease of 45.4% referred to the value after preparation of the dispersion.

Example 5

A water-in-water polymer dispersion is prepared as in Example 4, except that the monomer solution contains 267.6 g water and 10.0 g fine citric acid powder are added after polymerisation.

The dispersion has a solution viscosity of 548 mPas and a salt viscosity of 227 mPas. The solution viscosity is 336 mPas after storage of the dispersion for a period of 55 days at a temperature of 50° C., this corresponding to a decrease of 38.7% referred to the value after preparation of the dispersion.

Example 6

A water-in-water polymer dispersion is prepared as in Example 4, except that the monomer solution contains 257.6 g water and 20.0 g fine citric acid powder are added after polymerisation.

The dispersion has a solution viscosity of 572 mPas and a salt viscosity of 226 mPas. The solution viscosity is 416 mPas after storage of the dispersion for a period of 55 days at a temperature of 50° C., this corresponding to a decrease of 27.3% referred to the value after preparation of the dispersion.

Comparative Example 4

Example 4 was repeated, but without adding citric acid at any time.

The dispersion has a solution viscosity of 500 mPas and a salt viscosity of 208 mPas. The solution viscosity is 5 mPas after storage of the dispersion for a period of 55 days at a temperature of 50° C., this corresponding to a decrease of 99% referred to the value after preparation of the dispersion.

Example 7

A monomer solution is prepared, as described in Example 4. 2.0 g 30% hydrochloric acid are additionally mixed into the solution, which is polymerised in accordance with the procedure specified in Example 1. 5.0 g adipic acid are then mixed into the water-in-water polymer dispersion, which is then cooled in the manner described.

The dispersion has a solution viscosity of 708 mPas and a salt viscosity of 298 mPas.

The solution viscosity determined is 464 mPas after storage of the dispersion for a period of 45 days at a temperature of 50° C., this corresponding to a decrease of 34.5% referred to the value after preparation of the dispersion.

Example 8

A monomer solution is prepared, as described in Example 4. 2.0 g 30% hydrochloric acid are additionally mixed into the solution, which is polymerised in accordance with the procedure specified in Example 1. 5.0 g benzoic acid are then mixed into the water-in-water polymer dispersion, which is then cooled in the manner described.

The dispersion has a solution viscosity of 768 mPas and a salt viscosity of 319 mPas.

The solution viscosity determined is 532 mPas after storage of the dispersion for a period of 45 days at a temperature of 50° C., this corresponding to a decrease of 30.7% referred to the value after preparation of the dispersion.

Example 9

A monomer solution is prepared, as described in Example 4. 2.0 g 30% hydrochloric acid are additionally mixed into the solution, which is polymerised in accordance with the procedure specified in Example 1. 0.5 g 50% sulphuric acid are then mixed into the water-in-water polymer dispersion, which is then cooled in the manner described.

The dispersion has a solution viscosity of 716 mPas and a salt viscosity of 290 mPas.

The solution viscosity determined is 460 mPas after storage of the dispersion for a period of 45 days at a temperature of 50° C., this corresponding to a decrease of 35.8% referred to the value after preparation of the dispersion.

Example 10

A monomer solution is prepared, as described in Example 4. 2.0 g 30% hydrochloric acid are additionally mixed into the solution, which is polymerised in accordance with the procedure specified in Example 1. 2.5 g acetic acid are then mixed into the water-in-water polymer dispersion, which is then cooled in the manner described.

The dispersion has a solution viscosity of 940 mPas and a salt viscosity of 395 mPas.

The solution viscosity determined is 656 mPas after storage of the dispersion for a period of 45 days at a temperature of 50° C., this corresponding to a decrease of 30.2% referred to the value after preparation of the dispersion.

Example 11

A monomer solution is prepared, as described in Example 4. 2.0 g 30% hydrochloric acid are additionally mixed into the solution, which is polymerised in accordance with the procedure specified in Example 1. 5.0 g citric acid are then mixed into the water-in-water polymer dispersion, which is then cooled in the manner described.

The dispersion has a solution viscosity of 780 mPas and a salt viscosity of 341 mPas.

The solution viscosity determined is 504 mPas after storage of the dispersion for a period of 45 days at a temperature of 50° C., this corresponding to a decrease of 35.4% referred to the value after preparation of the dispersion.

Comparative Example 5

A monomer solution is prepared, as described in Example 4. 2.0 g 30% hydrochloric acid are additionally mixed into the solution, which is polymerised and cooled in accordance with the procedure specified in Example 1.

The dispersion has a solution viscosity of 680 mPas and a salt viscosity of 287 mPas. The solution viscosity determined is 368 mPas after storage of the dispersion for a period of 45 days at a temperature of 50° C., this corresponding to a decrease of 45.9% referred to the value after preparation of the dispersion.

Example 12

The procedure described in Example 11 is used, except that the monomer solution now contains 20.0 g sodium chloride instead of 20.0 g technical ammonium sulphate. The dispersion has a solution viscosity of 752 mPas and a salt viscosity of 302 mPas.

The solution viscosity determined is 568 mPas after storage of the dispersion for a period of 45 days at a temperature of 50° C., this corresponding to a decrease of 24.5% referred to the value after preparation of the dispersion.

Example 13

The procedure described in Example 11 is used, except that the monomer solution now contains 20.0 g sodium sulphate. 10 $H_2O$ instead of 20.0 g technical ammonium sulphate. The dispersion has a solution viscosity of 976 mPas and a salt viscosity of 406 mPas.

The solution viscosity determined is 672 mPas after storage of the dispersion for a period of 45 days at a temperature of 50° C., this corresponding to a decrease of 31.1% referred to the value after preparation of the dispersion.

Example 14

305.5 g fully demineralised water, 135.5 g 80% by weight trimethylammonium ethylacrylate chloride, 195.2 g 50% by weight acrylamide solution, 300.0 g 40% by weight polytrimethylammoniumpropylacrylamide chloride with a viscosity of the aqueous solution in the range of 150 to 300 mPas, 20.5 g polyethylene glycol with a molecular weight in the range of 9,000 to 12,000, 5.0 g technical ammonium sulphate and 2.0 g 5% by weight diethylenetriamine valeric acid sodium salt are put into a 2 l flask fitted with an agitator, a nitrogen supply line and a connection to a vacuum pump.

The pH of the solution is 5.0. In accordance with the procedure specified in Example 1, the solution is freed of oxygen, heated to 40° C. and polymerised by adding 1 ml of a 5% by weight aqueous solution of sodium disulphate and 5 ml 0.01% by weight tertiary butyl hydroperoxide. If necessary, further small quantities of tertiary butyl hyperoxide are subsequently added. After a maximum temperature of 56° C. has been reached, 5.0 g fine citric acid powder are mixed into the water-in-water polymer dispersion by stirring and the dispersion is then cooled to 20° C. while stirring constantly. The polymer content of the dispersion is 33.5% by weight.

The dispersion has a solution viscosity of 912 mPas and a salt viscosity of 151 mPas. The solution viscosity is 732 mPas after storage of the dispersion for a period of 42 days at a temperature of 50° C., this corresponding to a decrease of 19.7% referred to the value after preparation of the dispersion.

Example 15

A water-in-water polymer dispersion is prepared as in Example 14, except that the monomer solution contains 300.5 g water and 10.0 g fine citric acid powder are added after polymerisation.

The dispersion has a solution viscosity of 1380 mPas and a salt viscosity of 225 mPas. The solution viscosity is 1410 mPas after storing the dispersion for a period of 42 days at a temperature of 50° C.

Comparative Example 6

Example 15 is repeated, the difference being that no citric acid is added after polymerisation.

The dispersion has a solution viscosity of 1240 mPas and a salt viscosity of 214 mPas. The solution viscosity is 256 mPas after storage of the dispersion for a period of 42 days at a temperature of 50° C., this corresponding to a decrease of 79.4% referred to the value after preparation of the dispersion.

Application Examples I-VIII

The respective flocculation values of the water-in-water dispersions obtained in accordance with Examples 1 and 2 and Comparative examples 1 and 2 were determined by the method described above, both immediately after preparation and after storage in closed containers for 20 days at 50° C.

The corresponding flocculation values in seconds are stated in Table I, below.

TABLE I

| Application example | Water-in-water dispersion according to | Flocculation value (s) |
|---|---|---|
| I | Example 1, day of preparation | 12.8 |
| II | Example 1, after storage for 20 days at 50° C. | 12.9 |
| III | Comparative example 1, day of preparation | 12.6 |
| IV | Comparative example 1, after storage for 20 days at 50° C. | 34.6 |
| V | Example 2, day of preparation | 6.8 |
| VI | Example 2, after storage for 20 days at 50° C. | 7.2 |
| VII | Comparative example 2, day of preparation | 7.0 |
| VIII | Comparative example 2, after storage for 20 days at 50° C. | 23.9 |

Application examples IX A - XVI C

The water-in-water dispersions obtained in accordance with Examples 1 and 2 and Comparative examples 1 and 2 were used as drainage aids, both after preparation and after storage in a sealed container for 20 days at 50° C. Their effect was determined in accordance with the above-mentioned Schopper-Riegler method.

The corresponding values are stated in Table II, below.

TABLE II

| Application example | Water-in-water dispersion according to | Drainage time (s) |
| --- | --- | --- |
| IX A | Example 1, day of preparation | 98 |
| IX B | Example 1, day of preparation | 79 |
| IX C | Example 1, day of preparation | 61 |
| X A | Example 1, after storage for 20 days at 50° C. | 99 |
| X B | Example 1, after storage for 20 days at 50° C. | 77 |
| X C | Example 1, after storage for 20 days at 50° C. | 60 |
| XI A | Comparative example 1, day of preparation | 96 |
| XI B | Comparative example 1, day of preparation | 80 |
| XI C | Comparative example 1, day of preparation | 61 |
| XII A | Comparative example 1, after storage for 20 days at 50° C. | 122 |
| XII B | Comparative example 1, after storage for 20 days at 50° C. | 118 |
| XII C | Comparative example 1, after storage for 20 days at 50° C. | 90 |
| XIII A | Example 2, day of preparation | 82 |
| XIII B | Example 2, day of preparation | 60 |
| XIII C | Example 2, day of preparation | 50 |
| XIV A | Example 2, after storage for 20 days at 50° C. | 84 |
| XIV B | Example 2, after storage for 20 days at 50° C. | 60 |
| XIV C | Example 2, after storage for 20 days at 50° C. | 50 |
| XV A | Comparative example 2, day of preparation | 83 |
| XV B | Comparative example 2, day of preparation | 61 |
| XV C | Comparative example 2, day of preparation | 51 |
| XVI A | Comparative example 2, after storage for 20 days at 50° C. | 101 |
| XVI B | Comparative example 2, after storage for 20 days at 50° C. | 82 |
| XVI C | Comparative example 2, after storage for 20 days at 50° C. | 66 |

A, B, C stands for 0.01% by weight, 0.02% by weight and 0.03% by weight drainage aid on oven-dry material.

Application of the water-in-water dispersions obtained in accordance with Examples 3 to 15 and Comparative examples 3 to 6.

As indicated in Table III, the flocculation value (FV) of each of these water-in-water dispersions was determined by the method described above, both immediately after preparation and after storage for 20 days in a sealed container at 25° C. (RT) or 50° C. The drainage effect was also determined by the method described above after the specified storage.

TABLE III

| Ex. No. | Salt viscosity [mPa*s] | Solution viscosity [mPa*s] | FV Stb II [sec] | pH value 5% in FDW | Temp. [° C.] | Salt viscosity [mPa*s] | Solution viscosity [mPa*s] | FV Stb II [sec.] | Pulp Drainage* 0.05% [Sec.] | 0.1% [sec.] | 0.2% [sec.] | Temp. [° C.] | Days | Salt viscosity [mpa*s] |
| --- | --- | --- | --- | --- | --- | --- | --- | --- | --- | --- | --- | --- | --- | --- |
| 3 | 210 | 730 | 4.8 | 3.0 | RT | 232 | 1040 | 6.6 | 69 | 46 | 30 | RT | appr. 60 | 225 |
|   |   |   |   |   | 40° C. | 222 | 1072 | 6.5 | 70 | 47 | 30 | 40° C. | appr. 60 | 214 |
| C3 | 190 | 700 | 5.7 | 45 | RT | 196 | 704 | 7.4 | 71.5 | 49 | 32 | RT | appr. 60 | 192 |
|   |   |   |   |   | 40° C. | 155 | 532 | 7.4 | 73 | 49.5 | 33.5 | 40° C. | appr. 60 | 136 |
| 4 | 248 | 564 | 7.3 | 37 | RT | 204 | 520 | 7.6 | 71 | 46 | 27.5 | RT | appr. 60 | 220 |
|   |   |   |   |   | 50° C. | 199 | 432 | 7.5 | 71 | 50 | 29 | 50° C. | appr. 60 | 184 |
| C4 | 208 | 500 | 8.2 | 4.9 | RT | 187 | 436 | 10.2 | 62.5 | 38 | 28 | RT | appr. 55 | 174 |
|   |   |   |   |   | 50° C. | 77 | 76 | 19 | 75 | 52 | 38 | 50° C. | appr. 55 | 1 |
| 5 | 227 | 548 | 7 | 3.3 | RT | 214 | 520 | 68 | 74 | 46 | 30 | RT | appr. 55 | 217 |
|   |   |   |   |   | 50° C. | 206 | 452 | 8.2 | 75 | 49.5 | 31.5 | 50° C. | appr. 55 | 200 |
| C5 | 287 | 680 | 6.3 | 3.6 | RT | 270 | 636 | 7 | 66 | 43.5 | 26 | RT | appr. 55 | 257 |
|   |   |   |   |   | 50° C. | 237 | 492 | 7.4 | 70 | 45 | 28 | 50° C. | appr. 55 | 228 |
| 6 | 226 | 572 | 6.7 | 3.1 | RT | 226 | 548 | 7 | 70 | 49 | 29 | RT | appr. 55 | 225 |
|   |   |   |   |   | 50° C. | 228 | 488 | 7 | 72 | 52 | 31 | 50° C. | appr. 55 | 214 |
| C6 | 214 | 1240 | 8.5 | 4.2 | RT | 198 | 1150 | 9.4 | 75 | 51 | 29 | RT | appr. 42 | 170 |
|   |   |   |   |   | 50° C. | 105 | 495 | 16.4 | 86 | 59 | 35 | 50° C. | appr. 42 | 62 |
| 7 | 298 | 708 | 5.8 | 3.6 | RT | 323 | 732 | 6.6 | 71 | 44 | 23 | RT | appr. 50 | 287 |
|   |   |   |   |   | 50° C. | 285 | 600 | 6.8 | 75 | 47 | 24 | 50° C. | appr. 50 | 245 |
| 8 | 319 | 768 | 5.8 | 3.7 | RT | 332 | 784 | 6 | 70 | 41 | 24.5 | RT | appr. 45 | 315 |
|   |   |   |   |   | 50° C. | 301 | 644 | 6.3 | 83 | 50 | 29.5 | 50° C. | appr. 45 | 276 |
| 9 | 290 | 716 | 6.2 | 3.8 | RT | 298 | 708 | 6.3 | 79.5 | 44 | 27 | RT | appr. 45 | 302 |
|   |   |   |   |   | 50° C. | 260 | 520 | 6.6 | 86 | 48 | 28.5 | 50° C. | appr. 45 | 252 |
| 10 | 395 | 940 | 5.4 | 3.7 | RT | 402 | 932 | 5 | 82 | 46 | 26.5 | RT | appr. 45 | 408 |
|   |   |   |   |   | 50° C. | 368 | 776 | 5.4 | 98 | 56 | 31 | 50° C. | appr. 45 | 352 |
| 11 | 341 | 780 | 5.8 | 3.3 | RT | 298 | 740 | 6.4 | 65 | 43 | 25.5 | RT | appr. 60 | 318 |
|   |   |   |   |   | 50° C. | 308 | 676 | 6 | 67 | 44 | 25 | 50° C. | appr. 60 | 280 |
| 12 | 302 | 752 | 6.3 | 3.4 | RT | 302 | 728 | 6.5 | 70 | 44 | 24 | RT | appr. 50 | 308 |
|   |   |   |   |   | 50° C. | 296 | 680 | 6.5 | 73 | 45 | 24 | 50° C. | appr. 50 | 268 |
| 13 | 406 | 976 | 5.2 | 3.4 | RT | 426 | 996 | 4.8 | 69 | 42 | 21 | RT | appr. 50 | 404 |
|   |   |   |   |   | 50° C. | 390 | 864 | 5 | 70 | 45 | 21 | 50° C. | appr. 50 | 342 |
| 14 | 151 | 912 | 12.3 | 3.4 | RT | 145 | 910 | 12.5 | 79 | 56 | 30 | RT | appr. 42 | 134 |
|   |   |   |   |   | 50° C. | 135 | 854 | 13 | 81 | 56 | 31 | 50° C. | appr. 42 | 123 |
| 15 | 225 | 1380 | 8.1 | 3.3 | RT | 200 | 1260 | 9.9 | 73 | 48.5 | 26 | RT | appr. 42 | 202 |
|   |   |   |   |   | 50° C. | 200 | 1560 | 10.1 | 74 | 49 | 28 | 50° C. | appr. 42 | 198 |

TABLE III-continued

| Ex. No. | Solution viscosity [mPa*s] | FV Stb II [sec.] | pH value 5% in FDW | Viscosity drop** [%] |
|---|---|---|---|---|
| 3 | 854 | 6.4 | 3.1 | |
|  | 808 | 6.5 | 3.1 | 1.9 |
| C3 | 688 | 74 | 4.4 | |
|  | 456 | 8 | 4.4 | −28.4 |
| 4 | 536 | 76 | 3.6 | |
|  | 308 | 8.4 | 3.8 | −45.4 |
| C4 | 360 | 12.4 | 4.8 | |
|  | 5 | >60 | 4.6 | −99 |
| 5 | 520 | 7.2 | 3.2 | |
|  | 336 | 7.9 | 3.5 | −38.7 |
| C5 | 640 | 6.7 | 3.5 | |
|  | 368 | 7 | 3.8 | −45.9 |
| 6 | 552 | 7 | 3.1 | |
|  | 416 | 7.2 | 3.3 | −27.3 |
| C6 | 1110 | 12.2 | 4.3 | |
|  | 256 | 22 | 4.2 | −79.4 |
| 7 | 696 | 6.5 | 3.7 | |
|  | 464 | 6.7 | 3.6 | −34.5 |
| 8 | 768 | 6.2 | 3.6 | |
|  | 532 | 6.4 | 3.6 | −30.7 |
| 9 | 720 | 6.2 | 3.5 | |
|  | 460 | 6.6 | 3.8 | −35.8 |
| 10 | 928 | 5.1 | 3.5 | |
|  | 656 | 5.4 | 3.7 | −30.2 |
| 11 | 764 | 6 | 3.3 | |
|  | 504 | 6.4 | 3.6 | −35.4 |
| 12 | 772 | 6.4 | 3.4 | |
|  | 568 | 6.6 | 3.4 | −24.5 |
| 13 | 968 | 5 | 3.4 | |
|  | 672 | 5.2 | 3.5 | −31.1 |
| 14 | 944 | 14.8 | 3.4 | |
|  | 732 | 16.8 | 3.6 | −19.7 |
| 15 | 1240 | 10.1 | 3.3 | |
|  | 1410 | 13.6 | 3.3 | 26.1 |

FV = Flocculation value
STb II = Stabiliser II
FDW = Fully demineralised water
* = According to Schopper–Riegler
Temp. = Temperature during storage
RT = 25° C.
** = Viscosity drop in the solution viscosity after preparation resulting from storage
C = Comparative example

The invention claimed is:

1. A method for manufacturing a water-in-water polymer dispersion containing a water-soluble and/or water-swellable polymer A and at least one polymeric dispersant B, comprising:
   a) dispersing monomers in an aqueous phase containing the water-soluble dispersant B to form a monomer dispersion, wherein said monomers consist of one or more of the monomers (i), (ii), and (iii):
   (i) a non-ionic monomer of formula (I)

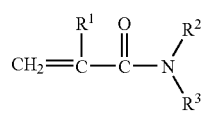

(I)

where
R$^1$ is a hydrogen or a methyl residue, and
R$^2$ and R$^2$ are, independently of each other, hydrogen, an alkyl or a hydroxyalkyl residue with 1 to 5 C atoms;

(ii) a cationic monomer of formula (II)

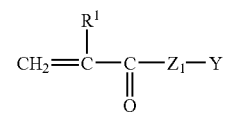

(II)

where
R$^1$ is a hydrogen or a methyl residue,
Z$_1$ is O, NH or NR$_4$ wherein R$_4$ is an alkyl residue with 1 to 4 C atoms, and
Y is one of

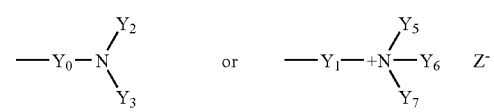

wherein Y$_0$ and Y$_1$ are an alkylene residue with 2 to 6 C atoms, optionally substituted with hydroxy groups, $Y_2$, $Y_3$, $Y_4$, $Y_5$, $Y_6$, $Y_7$, independently of each other, are each an alkyl residue with 1 to 6 C atoms; and $Z^-$ is a halogen, acetate, or $SO_4CH_3^-$; and (iii) an amphiphilic monomer of formula (III) or (IV)

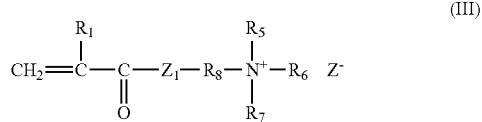 (III)

where $Z_1$ is O, NH, $NR_4$ wherein $R_4$ is an alkyl residue with 1 to 4 carbon atoms, $R_1$ is a hydrogen or a methyl residue, $R_8$ is an alkylene residue with 1 to 6 carbon atoms, $R_5$ and $R_6$ are, independently of each other, an alkyl residue with 1 to 6 carbon atoms, $R_7$ is an alkyl residue with 8 to 32 carbon atoms, and $Z^-$ is a halogen, pseudo-halogen, $SO_4CH_3$ or acetate, or

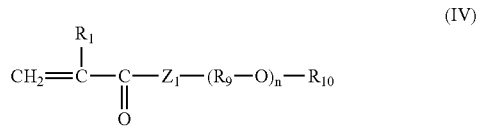 (IV)

where $Z_1$ is O, NH, $NR_4$ wherein $R_4$ is an alkyl residue with 1 to 4 carbon atoms, $R_1$ is a hydrogen or a methyl residue, $R_{10}$ is a hydrogen, alkyl, aryl and/or aralkyl residue with 8 to 32 carbon atoms, $R_9$ is an alkylene residue with 2 to 6 carbon atoms, and n is an integer between 1 and 50;

b) adding a water-soluble salt;

c) subjecting the monomer dispersion formed in b) to a radical polymerization to form a dispersion of the water-soluble or water-swellable polymer A, and, after polymerization;

d) adding a water-soluble acid to the dispersion of the water-soluble and/or water-swellable polymer A;

wherein the polymeric dispersant B is a cationic polymer comprising at least 30% by weight of polymerized cationic monomer, and the acid is added in an amount of from 0.1 to 5% by weight and the salt is added in an amount of up to 3% by weight, where the total quantity of salt and acid is a maximum of 5% by weight; wherein % by weight is based on the total weight of the dispersion.

2. The method of claim 1, wherein the acid is added in an amount of 0.2 to 3.5% by weight, based on the total weight of the dispersion.

3. The method of claim 1, wherein the salt is added in an amount of up to a maximum of 2.0% by weight, based on the total weight of the dispersion.

4. The method of claim 1, wherein the acid and the salt are added in a total amount of a maximum of 3.5% by weight, based on the total weight of the dispersion.

5. The method of claim 1, wherein the water-soluble acid is at least one of an organic acid and an inorganic acid.

6. The method of claim 5, wherein the water-soluble acid is at least one selected from the group consisting of aliphatic or an aromatic monocarboxylic acid, dicarboxylic acid, polycarboxylic acid and a hydroxycarboxylic acid.

7. The method of claim 5, wherein the water-soluble acid is at least one selected from the group consisting of hydrochloric acid, sulphuric acid, nitric acid and phosphoric acid.

8. The method of claim 1, wherein the water-soluble salt is at least one selected from the group consisting of an ammonium salt, an alkaline metal salt and an alkaline-earth metal salt.

9. The method of claim 8, wherein the water-soluble salt is at least one selected from the group consisting of an ammonium salt, sodium salt, potassium salt, calcium salt and magnesium salt.

10. The method of claim 8, wherein the water-soluble salt is a salt of an inorganic acid or an organic acid.

11. The method of claim 10, wherein the water-soluble salt is at least one selected from the group consisting of a salt of an aliphatic or aromatic monocarboxylic, dicarboxylic or polycarboxylic acid, and a hydroxycarboxylic acid.

12. The method of claim 11, wherein the water-soluble salt is at least one selected from the group consisting of sodium chloride, ammonium sulphate and sodium sulphate.

13. The method of claim 1, wherein the polymeric dispersant B is a water-soluble polymer with a maximum $M_w$ of $2.0 \times 10^6$.

14. The method of claim 13, wherein polymeric dispersant B contains at least one functional group selected from the group consisting of ether, carboxyl, sulpho, sulphate ester, amino, amido, imido, tertiary amino and quaternary ammonium groups.

15. The method of claim 14, wherein the polymeric dispersant B is at least one selected from the group consisting of a cellulose derivative, polyvinyl acetate, starch, starch derivative, dextran, polyvinylpyrrolidone, polyvinylpyridine, polyethylene imine, polyamine, polyvinyl imidazole, polyvinyl succinimide, polyvinyl-2-methylsuccinimide, polyvinyl-1,3-oxazolidone-2, polyvinyl-2-methylimidazoline, a copolymer thereof with maleic acid, maleic anhydride, famaric acid, itaconic acid, itaconic anhydride, (meth)acrylic acid, salts of (meth)acrylic acid and a (meth)acrylic acid amide compound.

16. The method of claim 1, wherein the cationic monomer is at least one selected from the group consisting of a diallyl dimethylammonium chloride, a dialkylaminoalkyl(meth)acrylate and dialkylaminoalkyl(meth)acrylamide with $C_1$-$C_3$ in the alkyl or alkylene groups and protonated or quaternised as an ammonium salt.

17. The method of claim 13, wherein the polymeric dispersant B further comprises at least one polyfunctional alcohol selected from the group consisting of a polyalkylene glycol, a block polymer of propylene/ethylene oxide with a molecular weight of 1,500 to 50,000, glycerin, ethylene glycol, propylene glycol, pentaerythritol and sorbitol.

18. The method of claim 13, wherein the polymeric dispersant B and a polyfunctional alcohol are added in quantities of 5 to 50% by weight, based on the total weight of the dispersion.

19. The method of claim 13, wherein the polymeric dispersant B further comprises a polyfunctional alcohol and the weight ratio of polymeric dispersant B to the polyfunctional alcohol is 1:0.01 to 0.5.

20. The method of claim 1, wherein the polymerizing forms the polymer A having an $M_w$ of $>1.0 \times 10^6$ g/mol.

21. The method of claim 1, wherein the polymer A comprises from 1 to 99% by weight, of one or more cationic monomers.

22. The method of claim 1, wherein the polymer A is present in quantities of 5 to 60% by weight, based on the total weight of the composition.

23. The method of claim 1, further comprising:
continuously adding an initiator system during the entire course of polymerisation.

24. A water-in-water polymer dispersion obtained by the method of claim 1.

25. The water-in-water polymer dispersion of claim 24 which is a flocculant in the sedimentation of solids, the conditioning of water and process water, in waste water treatment, in raw materials extraction, in coal extraction, in aluminium extraction, in petroleum extraction, an auxiliary in papermaking or a demulsifier in the separation of water mixtures containing at least one oil and fat.

26. The water-in-water polymer dispersion of claim 24, which is a thickener.

27. The water-in-water polymer dispersion of claim 24, which is a retention agent and drainage aid in papermaking.

28. The water-in-water polymer dispersion of claim 24, which is an additive for a crop protection agent.

29. The water-in-water polymer dispersion of claim 24, which is an additive for an anti-erosion agent.

30. The method of claim 1, wherein the acid is added in a quantity of from 0.3 to 2.0% by weight based on the total weight of the dispersion.

31. The method of claim 1, wherein the salt is added in a quantity of from 0.5 to 1.5% by weight based on the total weight of the dispersion.

32. The method of claim 1, wherein the water-soluble acid is at least one selected from the group consisting of an organic carboxylic acid, sulfonic acid, phosphonic acid and a mineral acid.

33. The method of claim 1, wherein the water-soluble acid is at least one selected from the group consisting of acetic acid, propionic acid, citric acid, oxalic acid, succinic acid, malonic acid, adipic acid, fumaric acid, maleic acid, and benzoic acid.

34. The method of claim 1, wherein the carboxylic acid is at least one selected from the group consisting of citric acid, adipic acid and benzoic acid.

35. The method of claim 8, wherein the salt is a salt of at least one selected from the group consisting of an organic carboxylic acid, a sulphonic acid, a phosphonic acid, and a mineral acid.

36. The method of claim 10, wherein the water-soluble salt is at least one selected from the group consisting of acetic acid, propionic acid, citric acid, oxalic acid, succinic acid, malonic acid, adipic acid, fumaric acid, maleic acid, benzoic acid, sulphuric acid, hydrochloric acid and phosphoric acid.

37. The method of claim 11, wherein the polymeric dispersant B is a water-soluble polymer having a maximum $M_w$ of from 50,000 to $1.2 \times 10^6$ g/mol and may be present as a mixture with one or more of a polyfunctional alcohol and a conversion product of a polyfunctional alcohol with a fatty amine.

38. The method of claim 13, wherein the dispersant B is a cationic polymer comprising at least 50% by weight of a cationic monomer.

39. The method of claim 13, wherein the polymeric dispersant B is a cationic polymer consisting of a cationic monomer.

40. The method of claim 1, wherein the cationic monomer is at least one selected from the group consisting of a methyl chloride quaternised ammonium salt of dimethylaminoethyl (meth)acrylate, dimethylaminopropyl(meth)acrylate and dimethylaminopropyl(meth)acrylamide.

41. The method of claim 1, wherein the cationic monomer is a diallyl dimethylammonium chloride.

42. The method of claim 13, wherein the polyfunctional alcohol is a polyethylene glycol.

43. The method of claim 1, wherein the polymeric dispersant B and a polyfunctional alcohol are added in a quantity of from 10 to 20% by weight based on the total weight of the dispersion.

44. The method of claim 19, wherein the weight ratio of the polymeric dispersant B to the polyfunctional alcohol is 1:0.01 to 0.3.

45. The method of claim 1, wherein the polymer A comprises one or more water-soluble monomers.

46. The method of claim 1, wherein $Y_0$ and $Y_1$ are substituted with one or more hydroxy groups.

47. The method of claim 1, wherein the polymer A comprises from 20 to 80% by weight of one or more cationic monomers.

48. The method of claim 1, wherein the polymer A is present in a quantity of from 10 to 50% by weight based on the total weight of the dispersion.

49. The water-in-water polymer dispersion of claim 28, further comprising one or more biologically effective substances.

50. A method for making a water-in-water polymer dispersion comprising a polymer A and at least one polymeric dispersant B, the method comprising:
a) dispersing one or more monomers in an aqueous phase comprising the polymeric dispersant, wherein said monomers consist of one or more of monomers (i), (ii), and (iii):
(i) a non-ionic monomer of formula (I)

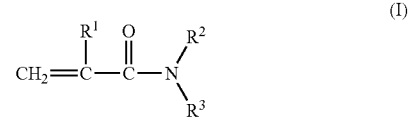

where
$R^1$ is a hydrogen or a methyl residue, and
$R^2$ and $R^2$ are, independently of each other, hydrogen, an alkyl or a hydroxyalkyl residue with 1 to 5 C atoms;
(ii) a cationic monomer of formula (II)

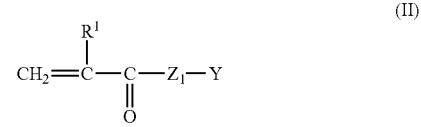

where
$R^1$ is a hydrogen or a methyl residue, $Z_1$ is O, NH or $NR_4$ wherein $R_4$ is an alkyl residue with 1 to 4 C atoms, and
Y is one of

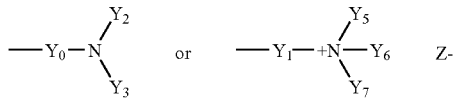 or 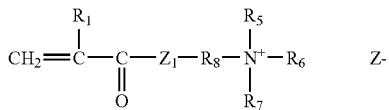 $Z^-$ wherein $Y_0$ and $Y_1$ are an alkylene residue optionally substituted with hydroxy groups, with 2 to 6 C atoms,
$Y_2, Y_3, Y_4, Y_5, Y_6, Y_7$, independently of each other, are each an alkyl residue with 1 to 6 C atoms; and
$Z^-$ is a halogen, acetate, or $SO_4CH_3^-$; and
(iii) an amphiphilic monomer of formula (III) or (IV)

$$CH_2=\underset{\underset{O}{\|}}{\overset{R_1}{C}}-C-Z_1-R_8-\underset{R_7}{\overset{R_5}{N^+}}-R_6 \quad Z^- \quad (III)$$

where
$Z_1$ is O, NH, $NR_4$ wherein $R_4$ is an alkyl residue with 1 to 4 carbon atoms,
$R_1$ is a hydrogen or a methyl residue,
$R_8$ is an alkylene residue with 1 to 6 carbon atoms,
$R_5$ and $R_6$ are, independently of each other, an alkyl residue with 1 to 6 carbon atoms,
$R_7$ is an alkyl residue with 8 to 32 carbon atoms, and
$Z^-$ is a halogen, pseudo-halogen, $SO_4CH_3$ or acetate, or

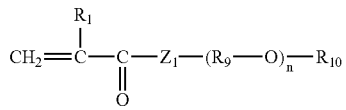

where
$Z_1$ is O, NH, $NR_4$ wherein $R_4$ is an alkyl residue with 1 to 4 carbon atoms,
$R_1$ is a hydrogen or a methyl residue,
$R_{10}$ is a hydrogen, an alkyl, aryl and/or aralkyl residue with 8 to 32 carbon atoms,
$R_9$ is an alkylene residue with 2 to 6 carbon atoms, and
n is an integer between 1 and 50,
b) adding a water-soluble salt;
c) polymerizing the monomers in the aqueous phase formed in b) by radical polymerization to form a mixture of a water-soluble or water-swellable polymer A and the polymeric dispersant B; then
d) adding a water-soluble acid to the mixture to form the water-in-water dispersion;
wherein the polymeric dispersant B is a cationic polymer comprising at least 30% by weight of polymerized cationic monomer, and
the water-soluble acid is added to the mixture in an amount of from 0.1 to 0.5% by weight based on the total weight of the dispersion.

* * * * *